United States Patent [19]

Lhospice

[11] Patent Number: 4,464,025
[45] Date of Patent: Aug. 7, 1984

[54] SPECTACLE FRAME

[75] Inventor: Bernard Lhospice, Blois, France

[73] Assignee: Essilor International Cie Generale d'Optique, Echat, France

[21] Appl. No.: 393,548

[22] Filed: Jun. 30, 1982

[30] Foreign Application Priority Data

Jul. 2, 1981 [FR] France .................. 81 13018

[51] Int. Cl.³ .................. G02C 1/04; G02C 5/12
[52] U.S. Cl. .................. 351/106; 351/136; 351/154
[58] Field of Search .............. 351/106, 136, 137, 138, 351/154

[56] References Cited

FOREIGN PATENT DOCUMENTS 27415 4/1981 European Pat. Off. .
1094381 5/1955 France .
1097418 7/1955 France .
533161 2/1941 United Kingdom .
775293 5/1957 United Kingdom .

Primary Examiner—John K. Corbin
Assistant Examiner—Rodney B. Bovernick
Attorney, Agent, or Firm—Charles E. Brown

[57] ABSTRACT

In a spectacle frame each lens surround is formed by a relatively rigid rail and a flexible retaining member attached at each end to the rail. To effect this attachment the ends of each rail are formed with two transverse holes through which the flexible retaining member is passed twice. Each nose pad of the spectacle frame is also formed with two transverse holes through which the flexible retaining member may be passed twice. The holes in each nose pad correspond to those in the nose end of the associated rail, so that the nose pad may be attached to the rail by means of the flexible retaining member holding a lens in position in the surround.

6 Claims, 4 Drawing Figures

SPECTACLE FRAME

The present invention is generally concerned with spectacle frames.

As is known, a spectacle frame generally comprises a support structure, two surrounds each adapted to receive a respective lens, and two nose pads each adapted to bear on the nose of the user.

The present invention is more particularly concerned with spectacle frames in which each surround consists of a relatively rigid rail and a flexible retaining member coupled to the rail at each end thereof.

Such spectacle frames have been known in principle for many years, through the disclosure of British Pat. No. 775,293 in particular.

In this British patent the rails of the surrounds form part of the support structure.

In practice, however, they are more usually separate therefrom.

This is the case in French Pat. No. 1,094,381 and Patents of Addition thereto, for example. In such cases each end of a rail is formed with two transverse holes so that the associated flexible retaining member may be passed twice through the rail to lock it in position.

It is usual for the nose pads, which in practice are normally separate parts independent of one another, to be attached once and for all to the corresponding rails or to the support structure.

This arrangement has given and continues to give satisfaction, but has a number of disadvantages, however.

First of all, it requires reliable means for attaching the nose pads to the support structure or rails, such as snap-action engagement means, pins or the like. This can make the spectacle frame heavy and may be unfavourable with regard to the aesthetic appearance of the spectacle frame by broadening the line thereof.

Also, nose pads fixedly attached to the support structure or rails in this way may not suit all users and in practice are rarely suitable for children.

British Pat. No. 775,293 proposes that the flexible retaining members should be used to attach the nose pads.

In this case, each of the latter is also formed with two transverse holes through which the flexible retaining member may be passed twice.

In British Pat. No. 775,293, however, each nose pad is simply engaged on the associated flexible retaining member, for direct application to the edge of the corresponding lens.

As a result, it is not securely held in position, and it may tend to slide along the edge of the lens and/or rotate relative to this edge.

Also, in practice this attachment method is feasible only for parallel-sided lenses of constant thickness, significantly reducing its applicability.

The general objective of the present invention is to provide an arrangement which overcomes the disadvantages outlined above and confers further advantages.

The invention consists in a spectacle frame comprising a support structure, two surrounds each adapted to receive a respective lens and each consisting of a relatively rigid rail formed at each end with two transverse holes and a relatively flexible retaining member coupled to said rail at each end thereof by passing through said holes, and two nose pads each adapted to bear on the nose of a wearer of the spectacle frame, wherein each nose pad is formed with two corresponding transverse holes so that said retaining member may also be passed twice therethrough, whereby said nose pad is coupled to said rail.

Using this arrangement, the nose pads are held firmly in position by the flexible retaining members alone, without any possibility of displacement and/or rotation and without additional weight or thickening of the line.

Also, the practitioner who normally fits the flexible retainiing members may select for each spectacle frame nose pads best suited to the morphology of the user, where possible giving the user a choice as to type and/or colour.

The nose pads may be separate and distinct parts independent of one another or two integral parts of a single saddle-shaped member.

Other objects and advantages will appear from the following description of an example of the invention, when considered in connection with the accompanying drawing, and the novel features will be particularly pointed out in the appended claims.

Figures 1, 2, 3, 4:
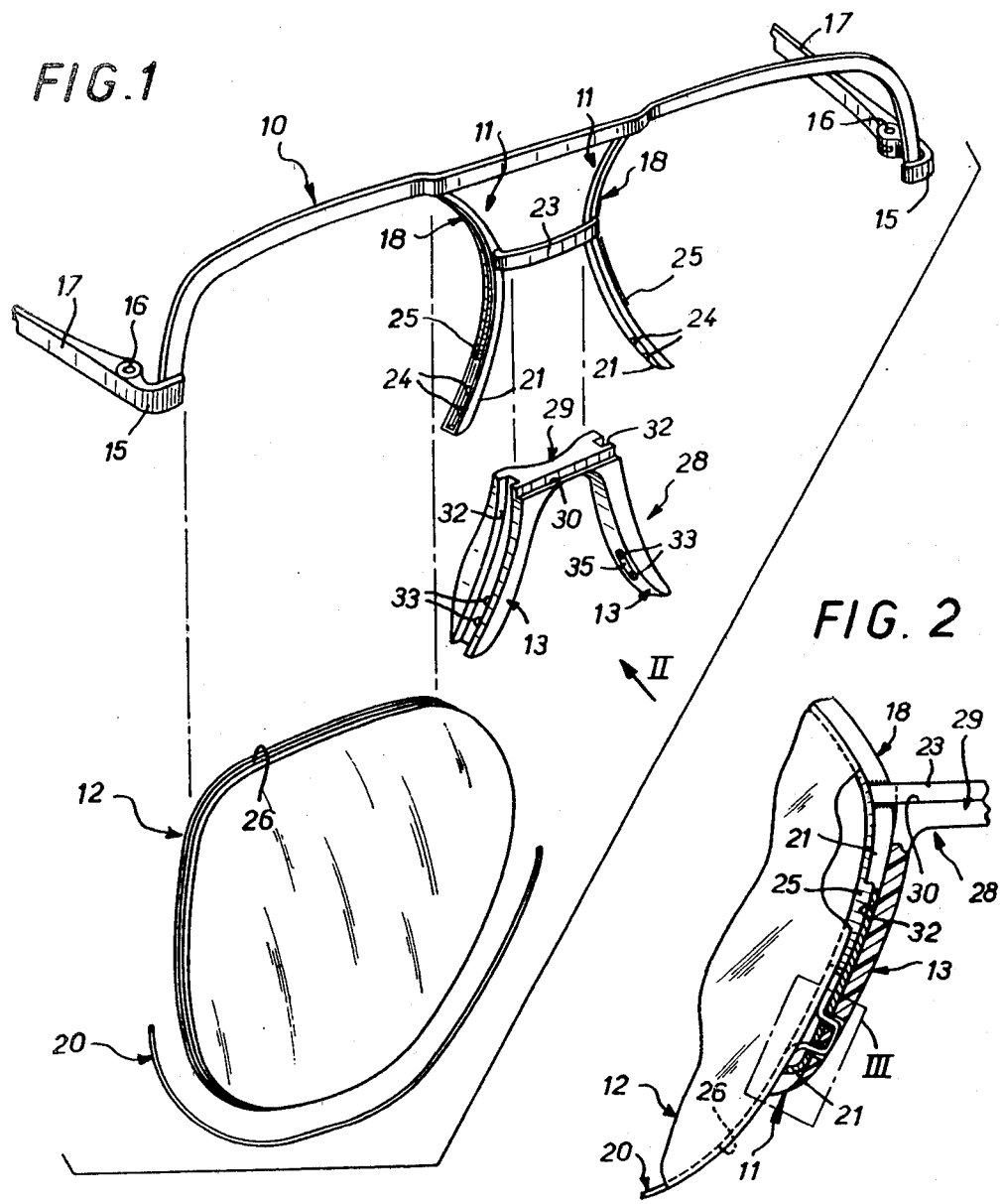
FIG. 1 is a partially exploded view in perspective of a spectacle frame in accordance with the invention.
FIG. 2 is a partially cut away view in elevation of part of the spectacle frame, as seen along the arrow II in FIG. 1.
FIG. 3 shows to a larger scale that part of FIG. 2 within the box III.
FIG. 4 is a view in perspective corresponding to part of FIG. 1 and relating to an alternative embodiment.

Referring to FIG. 1, in a manner known per se the spectacle frame in accordance with the invention generally comprises a support structure 10, two surrounds 11 each adapted to receive a lens 12, which may be a sight-correcting lens or plain protective glass or glass providing protection against sunlight, and two nose pads 13 each adapted to bear on the nose of the wearer.

In the embodiment shown support structure 10 comprises a simple bar member which is generally arc-shaped with a substantially straight centre section.

At each of its temporal ends support structure 10 is equipped with a lug 15 to which is pivoted by means of a hinge 16 a supporting side member 17.

Each of surrounds 11 consists of a relatively rigid rail 18 and a flexible retaining member 20.

FIG. 1 shows flexible retaining member 20 for only one of surrounds 11.

It consists of a filament which may be of metal, for example, or of a synthetic material such as that sold under the Trade Name "NYLON", for example.

Each rail 18 is of channel shape in transverse cross-section. It extends curvilinear fashion from a nose end 21 to a temporal end close to corresponding lug 15 and not visible in FIG. 1.

The central portion of each rail 18 is fastened to the rear of support structure 10, following the same profile.

Where these parts are of metal, for example, rails 18 may be attached to support structure 10 by soldering.

In the embodiment shown rails 18 are joined together in the vicinity of their nose end 21 by a bar 23 extending substantially parallel to the corresponding central portion of support structure 10.

Each flexible retaining member 20 is designed to be attached to the corresponding rail 18 at each end thereof.

For this purpose, the ends of each rail 18, and particularly the nose end thereof, are formed with two transverse holes 24 in the base of the channel constituted thereby, so that a flexible retaining member 20 may be passed twice therethrough.

Between the nose and temporal ends, and spaced from the corresponding holes 24, each rail 18 is equipped with a lip 25 which has a curved profile, projecting slightly relative to the flanking portions.

The edge of each lens 12 is formed with a groove 26 into which lip 25 of the corresponding rail 18 and the associated flexible retaining member 20 fit, as will be explained hereinafter.

In the embodiment shown in FIGS. 1 to 3, nose pads 13 are part of a single saddle-shaped member 28.

Thus they are linked at their upper ends by a common crossmember 29.

Preferably, and as shown, the front of the latter is formed with a rebate 30 whereby it engages behind bar 23.

In the embodiment shown, each nose pad 13 is further formed over its full height with a groove 32 whereby it may engage on the rail 18 of the corresponding surround 11.

It further comprises at least two transverse holes 33 so that the associated retaining member may be passed twice through it.

Thus in the embodiment shown in FIGS. 1 to 3 two holes 33 are formed in each nose pad 13.

The holes 33 in each nose pad 13 are in practice formed in the bottom of groove 32 thereon and spaced along this groove. In accordance with the invention, their positions correspond to those of holes 24 at nose end 21 of the corresponding rail 18.

In other words, holes 33 in each nose pad 13 are spaced apart by the same distance as holes 24 in nose end 21 of the associated rail 18.

Thus and as shown in FIGS. 2 and 3, when saddle-shaped member 28 is fitted with each nose pad 13 engaged by its groove 32 on rail 18 of the corresponding surround 11 and with crossmember 29 engaged by virtue of its rebate 30 on bar 23, holes 33 in nose pads 13 are aligned with corresponding holes 24 in nose ends 21 of rails 18.

Thus each flexible retaining member 20 may pass successively through one hole 24 of the corresponding rail 18 and then one hole 33 in the associated nose pad 13, then passing successively through the other hole 33 in nose pad 13 and the other hole 24 in rail 18, before resuming its initial configuration, as shown in FIGS. 2 and 3.

Each nose pad 13 is firmly attached to rail 18 of the corresponding surround 11 by virtue of flexible retaining member 20 passing twice therethrough.

Preferably, and as shown, holes 33 in each nose pad 13 open externally into a common recess 35, the depth of which is at least equal to the thickness of flexible retaining member 20, so that the latter will not project externally of the surface of nose pad 13.

As will be seen, each nose pad 12 is secured entirely and only by flexible retaining member 20 of the corresponding surround 11.

In the embodiment shown in FIGS. 1 to 3, holes 33 in each nose pad 13 are in the vicinity of that end of the nose pad opposite crossmember 29 which links it to the other nose pad.

This is not necessarily the case, however, and holes 33 may instead be positioned in the vicinity of crossmember 29, for example.

In the embodiment shown in FIG. 4, nose pads 13 are separate and distinct parts independent of one another.

In other words, they are no longer linked together by any form of common crossmember.

In this case, for preference and as shown, holes 33 therein are disposed substantially centrally thereon.

To attach them to rail 18 of the corresponding surround 11 a single pair of holes 33 may suffice, in view of their engagement on rail 18 by virtue of groove 32.

As an alternative, and particularly when there is no such grooved engagement, each nose pad may comprise four transverse holes 33, suitably spaced out, nose end 21 of each rail 18 then also comprising four holes 24 (not shown in the drawings).

In this case, each flexible retaining member 20 attaches nose pads 13 to rails 18 of surrounds 11 by passing twice through each pair of holes.

It will be understood that various changes in the details, materials and arrangements of parts, which have been herein described and illustrated in order to explain the nature of the invention, may be made by those skilled in the art within the principle and scope of the invention as expressed in the appended claims.

I claim:

1. A spectacle frame comprising a support structure, two rims each adapted to receive a respective lens and each comprising a relatively rigid rail having at each end two transverse holes and a relatively flexible retaining member attached to said rail at each end thereof by passing through said holes, and nose pad means separate from said rails and said support structure, said nose pad means comprising two nose pads each adapted to bear on the nose of a wearer of the spectacle frame, each nose pad having two corresponding transverse holes so that said retaining member may be also be passed twice therethrough, said flexible retaining member securing said nose pad means to said rail.

2. A spectacle frame according to claim 1, wherein each of said nose pads has four transverse holes.

3. A spectacle frame according to claim 1, wherein each of said nose pads has a groove for engagement on the corresponding rail, said holes in said nose pads being in the bottom of and spaced along said groove.

4. A spectacle frame according to claim 1, wherein each of said nose pads is secured entirely and only by said flexible retaining member to said rail of the corresponding rim.

5. A spectacle frame according to claim 1, wherein said nose pads are separate and distinct parts independent of each other.

6. A spectacle frame according to claim 1, wherein said nose pads means comprises a single saddle-shaped member, said nose pads being integrally formed with said saddle-shaped member.

* * * * *